United States Patent
Liu et al.

(10) Patent No.: US 6,400,690 B1
(45) Date of Patent: Jun. 4, 2002

(54) DUAL MAP SYSTEM FOR NAVIGATION AND WIRELESS COMMUNICATION

(75) Inventors: Te-Kai Liu, Elmsford; Michael C. Greenwood, Holmes; Lawrence I. Lieberman, Scarsdale; Kiyoshi Maruyama, Chappaqua; Paul A. Moskowitz, Yorktown Heights, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/172,611

(22) Filed: Oct. 15, 1998

(51) Int. Cl.$^7$ .......................... H04Q 7/00; G08G 1/123
(52) U.S. Cl. ...................... 370/252; 370/332; 370/487; 340/995; 701/214
(58) Field of Search .................. 455/99, 456; 340/988, 340/995; 342/450, 453, 454, 457; 370/390, 487, 252, 332; 701/207, 213, 214; 379/200

(56) References Cited

U.S. PATENT DOCUMENTS

| | | | |
|---|---|---|---|
| 5,299,132 A | * 3/1994 | Wortham et al. | 340/990 |
| 5,610,815 A | * 3/1997 | Gudat et al. | 342/457 |
| 5,760,742 A | * 6/1998 | Branch et al. | 342/457 |
| 5,777,580 A | * 7/1998 | Janky et al. | 342/457 |
| 6,150,961 A | * 11/2000 | Alewine et al. | 340/995 |

* cited by examiner

Primary Examiner—Alpus H. Hsu
Assistant Examiner—Afsar M. Qureshi
(74) Attorney, Agent, or Firm—Whitham, Curtis & Christofferson, P.C.; Stephen C. Kaufman

(57) ABSTRACT

A system produces of an empirical map of wireless communication coverage through a process of combining information from individual clients to produce a map which is then shared by all of the clients. The wireless coverage map aids in maintaining a reliable communications link. The empirical map is generated by combining information from a group of mobile wireless users. The group may consist of a fleet of trucks, taxicabs, government service vehicles, or the customers of a wireless service provider. The mobile vehicles must be equipped with a GPS device or be located by other means such as triangulation. While vehicles are moving, the quality of wireless communication, e.g., signal strength or communication continuity, is recorded for each vehicle as a function of positions. The data from all of the vehicles is combined to produce the empirical map. The empirical map may be maintained at a central site and subsets of the map replicated for individual vehicles. The map may then be used to direct mobile users to sites of superior communications reliability, warn mobile users when they are out of the service area or are about to leave the service area, or to regulate data communications automatically to stop and restart communications as a mobile vehicle passes through a gap in coverage.

16 Claims, 6 Drawing Sheets

DUAL MAP SYSTEM FOR NAVIGATION AND WIRELESS COMMUNICATION

BACKGROUND OF THE INVENTION

1. Field of the Invention

The present invention generally relates to wireless communications and, more particularly, to the creation of an empirical map of wireless coverage which quantifies the quality of wireless coverage over an area and resolves variations of coverage quality over the area to within the geographic accuracy of available location systems, such as the Global Positioning Satellite (GPS) system.

2. Background Description

Coverage areas for communications are defined only approximately by wireless carriers. Carriers do provide geographic maps of predicted coverage areas; however, existing maps do not define the precise degree of the coverage area or the locations of gaps within the advertised area. The imprecision of the existing maps is on the order of miles. Gaps in coverage may be caused by natural landscape features such as low lying valleys or by man made obstructions such as tunnels or tall buildings. Wireless communications providers may provide a disclaimer with their coverage map as an implied acknowledgment of such gaps.

In order to maintain communications for mobile applications, it is necessary that the mobile communications device be located in an area of reliable communications. For example, automobiles when stationary must be located in the reliable area. Today, the user must find such an area by chance or make a choice based upon personal experience. To maintain communications in a vehicle in motion is even more difficult. A moving automobile or truck on a highway will pass in and out of areas where communications are reliable as it moves. Currently, there is no way to predict where the transitions from good to bad communications occur.

The Global Positioning System (GPS) uses a set of twenty-four orbiting satellites to allow users to determine their locations. Systems for automotive use have dropped in price to the point where they can be purchased for a few hundred to a few thousand dollars. These systems are either built in to the vehicle (e.g., the Cadillac On-Star system) or are portable in a lap top computer (e.g., the Delorme GPS Tripmate system). Such systems, however, are essentially passive, one way systems; that is, they provide the driver with position information based on GPS data.

SUMMARY OF THE INVENTION

It is therefore an object of the present invention to provide an empirical map of wireless coverage which quantifies the quality of wireless coverage over an area.

It is another object of the invention to provide such an empirical map which resolves variations of coverage quality over the area to within the geographic accuracy of available Global Positioning Satellite (GPS) system. Such accuracy is 100 meters or better today for low cost civilian equipment and will be improved to 10 meters or better in the next decade by the launching of a new satellite system. Better precision is inherent in the system today and may be obtained with differential GPS.

According to the invention, there is provided a system for the production of an empirical map of wireless communication coverage through a process of combining information from individual clients to produce the map which is then shared by all of the clients. White spaces, areas not measured, can be discovered and then explored and added to the map database in a self-teaching process.

The invention provides a method to improve wireless communications by using a digital representation of the coverage map to aid in maintaining a reliable communications link. The invention also includes the adaptation of existing wireless coverage maps of wireless communication providers into the digital domain. The existing maps may then be used as the initial map upon which the empirical map it generated to improve wireless communications for mobile clients.

The empirical map may be generated by combining information from a group of mobile wireless users. The group may consist of a fleet of trucks, taxicabs, government service vehicles, or the customers of a wireless service provider. The mobile vehicles must be equipped with a GPS device or be located by other means such as triangulation. While vehicles are moving, the quality of wireless communication, e.g., signal strength or communication continuity are recorded for each vehicle as a function of positions. The data from all of the vehicles is combined to produce the empirical map. The empirical map may be maintained at a central site and replicated for individual vehicles. The map may then be used to direct mobile users to sites of superior communications reliability, warn mobile users when they are out of the service area or are about to leave the service area, or to regulate data communications automatically to stop and restart communications as a mobile vehicle passes through a gap in coverage. For instance, the data to be sent from a car about to enter a tunnel is stored in a buffer until the car leaves the tunnel.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
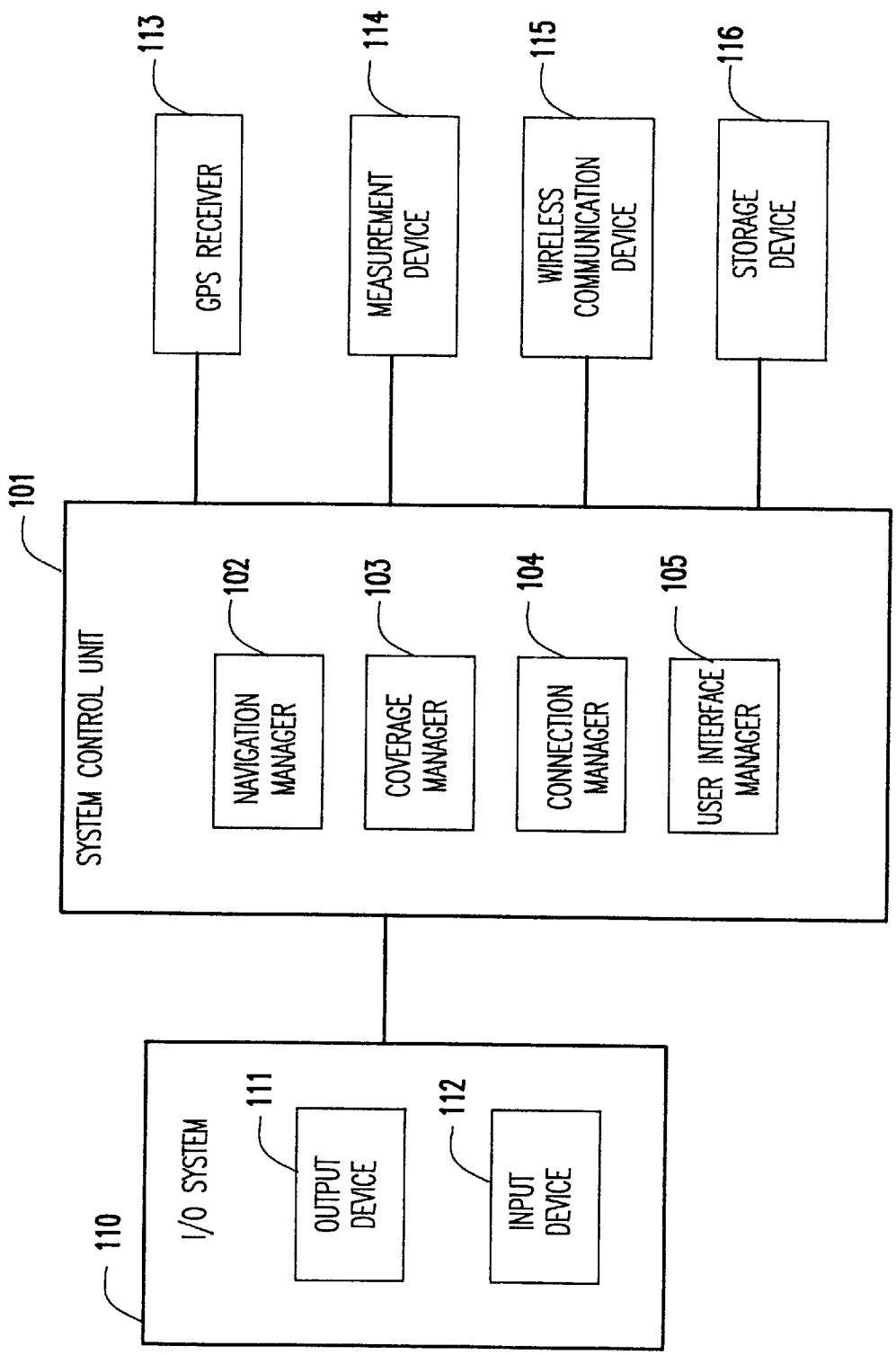
FIG. 1 is a block diagram showing the overall system according to the invention.

Referring now to the drawings, and more particularly to FIG. 1, there is shown the overall system diagram. The major components of the system include the system control unit 101, such as a general purpose computer having a central processing unit (CPU) supported by read only memory (ROM) storing basic input/output system (BIOS) and random access memory (RAM) storing application program code. Such a general purpose computer may be, for example, a lap top computer or an on board, built-in computer. The system unit 101 communicates with a user via an input/output (I/O) system 110, which comprises an output device 111, such as a speaker and display, and an input device 112, such as a microphone and a keyboard.

The system control unit 101 has connected to it and communicates with a GPS receiver 113, a measurement device 114, a wireless communication device 115, and the storage device 116. The GPS receiver 113 provides location information to the system control unit which determines from the GPS data the current location of the vehicle. While a GPS receiver is the preferred location determining device, it will be understood that other location systems based on triangulation algorithms, such as long-distance radio navigation system (LORAN), may also be used.

The measurement device 114 measures the field strength of wireless signals. These measurements are correlated with the location information from the GPS receiver or other location determining device and used to update the local wireless coverage map. This updating function is what makes the map an empirical map.

The wireless communication device 115 is required for transmitting and receiving data from a central server for the purpose of updating the wireless coverage map, as will be described in more detail with reference to FIG. 3. The wireless communication device 115 may be, for example, a digital cellular telephone which may be used for voice communications as well as data communications.

The storage device 116 may be a hard disk drive on which a navigation or street map and the wireless coverage map are stored. The navigation map and the wireless coverage map may be used to generate a route map for the vehicle, and this route map may also be stored on the storage device. The vehicle may travel on land (e.g., an automobile), on water (e.g., a ship), or in the air (e.g., an airplane). The wireless coverage map is typically a digitized version of the wireless coverage map derived from the wireless service provider. As will be described in more detail, this map is used to initialize the system and, as the vehicle is in route, is updated based on measurements made by the measurement device 114. Moreover, there may be multiple wireless coverage maps stored on the storage device 116, one for each wireless service provider which may be used. In addition, the storage device 116 may also include a compact disk (CD) or digital versatile disk (DVD) drive which stores a comprehensive navigation or street map of the coverage area in which the vehicle is located. The CD or DVD may also store the digitized versions of the multiple wireless coverage maps provided by the wireless service providers.

The system control unit 101 further comprises four software processes, the code for which may reside on the storage device 116 and then read into the RAM of the system control unit. These software processes are a navigation manager 102, a coverage manager 103, a connection manager 104, and a user interface manager 105, which are described in more detail with reference to FIG. 2.

Figure 2:
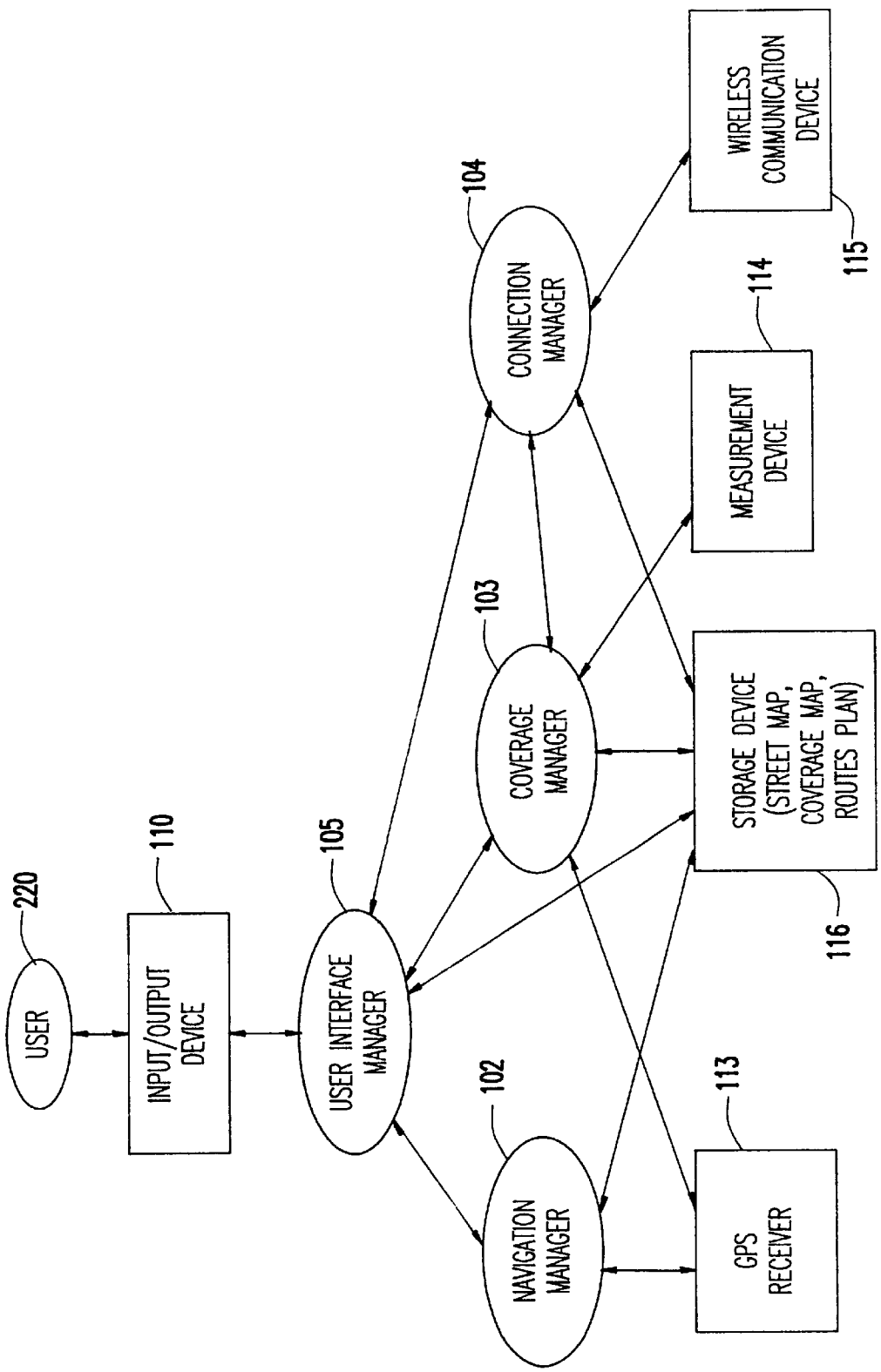
FIG. 2 is a flow diagram showing the interaction between processes and devices in the system shown in FIG. 1.

FIG. 2 shows the interaction between the components in FIG. 1. In FIG. 2, like reference numerals represent the same components in FIG. 1. The user 220 commands the system and gets system warning and event notification through the input/output system 110. The user interface manager 105 gets the user's command through the input/output system 110 and interacts with the navigation manager 102, the coverage manager 103, and the connection manager 104 to service the user's commands, present results, and give notification about the system events of interest to user 220 through the input/output system 110. For example, the user 220 may enter an origin and a destination and request a computed best route. Along that route, the user may have one or more checkpoints at which he or she desires to make contact with another party, perhaps someone at a central station. These checkpoints, which may be a location or a time period, are also entered by the user 220.

The navigation manager 102 has access to the navigation or street map and the coverage map stored in the storage device 116 for route planning or tracking and obtains the vehicle's location information from the GPS receiver 113 for vehicle location and navigation. When the user 220 requests a computed best route, it is the navigation manager 102 that makes this computation.

The coverage manager 103 has access to the measurement device 114 for the current quality of wireless coverage. The coverage manager 103 also has access to the storage device 116, which contains the street map, the coverage map, and route planning information, and interacts with the GPS receiver 113 for predicting the future wireless coverage quality according to the route plan stored in the storage device 116. Based on the prediction of the wireless coverage, the coverage manager 103 notifies the user interface manager 105 the events of interest to the user 220, e.g., soon to lose coverage and soon to regain coverage. The coverage manager 103 refines the coverage map by the new measurement from the measurement device 114 and the location information obtained from the GPS receiver 113.

The connection manager 104 obtains the predictive coverage information (e.g., estimated time until losing coverage or regaining coverage) from the coverage manager 103 and finds the best timing to make a wireless connection through the wireless communication device 115 to the person or destination with which the user 220 wants to communicate. The information about with whom the user wants to communicate is provided by the user interface manager 105 which receives this information from the I/O system 110 as input by the user 220. This information may be input by the user at anytime, either before departing as checkpoints or while in transit.

Figure 3:
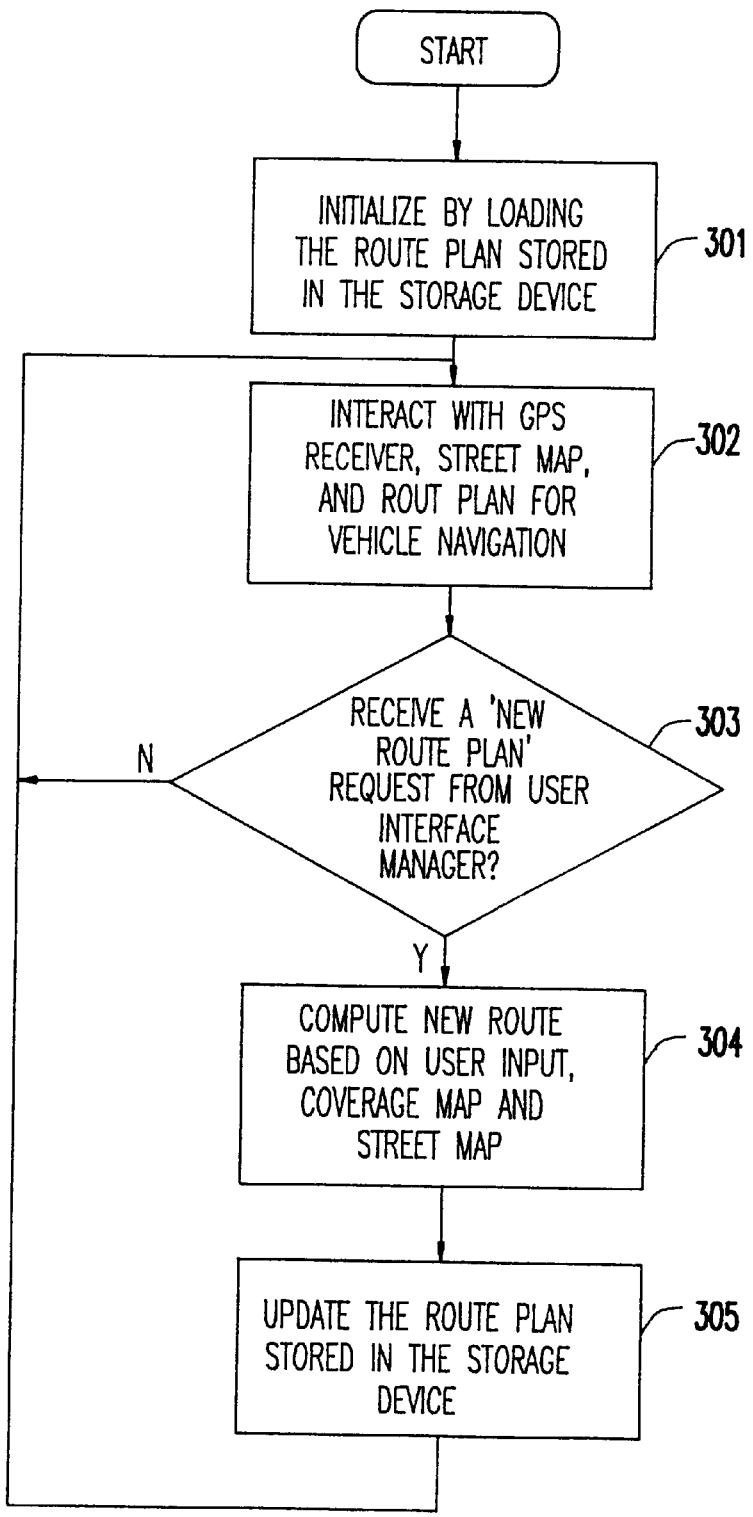
FIG. 3 is a flow chart showing the routine of the navigation manager executed on the system control unit.

FIG. 3 is a flow chart showing the routine of the navigation manager 102 executed on the system control unit 101. The process of the navigation manager 102 starts with an initialization step 301 in which the default route plan stored in storage device 116 is loaded in memory. After this initialization step, the process enters a loop the first step of which is a navigation task 302. This task is performed by interacting with the GPS receiver 113, street map and route plan until the navigation manager 102 receives a request from the user interface manager 105 to compute a new route, as determined in decision block 303. When such a request is received, the navigation manager 102 calculates a new route in step 304 based on the street/coverage maps in the storage device 116 as well as the user's input including the destination address and user preference criteria such as shortest distance, shortest travel time, and best wireless coverage. The resulting new route is stored in the storage device 116 in step 305 before the process loops back to step 302.

Figure 4:
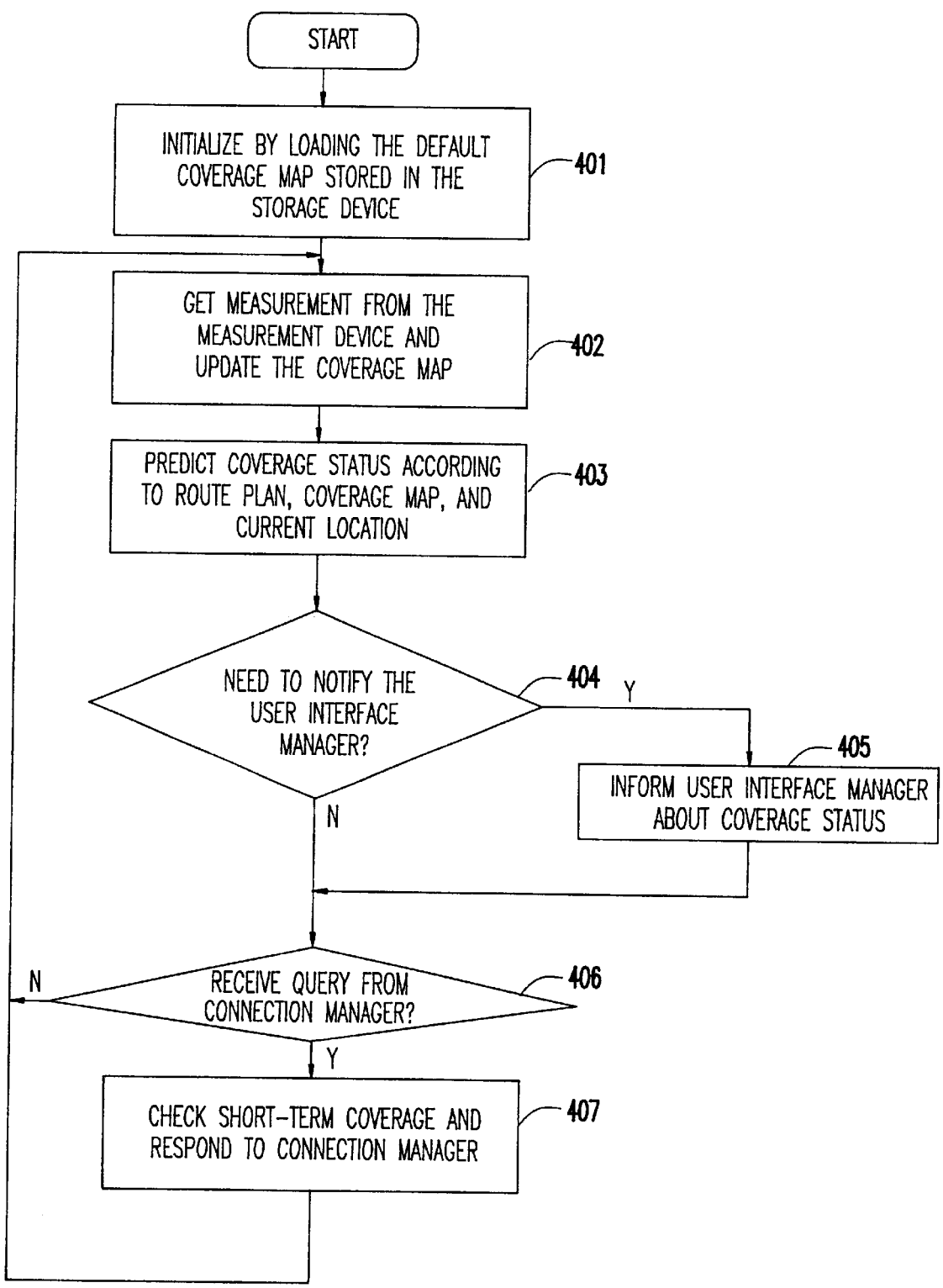
FIG. 4 is a flow chart showing the routine of the coverage manager executed on the system control unit.

FIG. 4 is a flow chart showing the routine of the coverage manager 103 executed on the system control unit 101. The process of the coverage manager 103 starts with an initialization step 401 in which the default route plan stored in storage device 116 is loaded in memory. After this initialization step, the process enters a loop the first step of which is a measurement task 402. In this step, the coverage manager 103 gets measurements of signal strength from the measurement device 114 and updates the coverage map stored in the storage device 116. The coverage manager then, in step 403, predicts coverage status according to the route plan, the coverage map, both stored in storage device 116, and the current position obtained from the GPS receiver 113.

The coverage manager checks in decision step 404 to determine if there is a need to notify the user interface manager 105. If so, the interface manager is informed about coverage status in step 405. The possible notifications include "soon to lose coverage", "soon to regain coverage", "coverage lost", "coverage regained", and the like. After informing the interface manager 105 about coverage status or if there is no information for the interface manager 105, the coverage manager checks in decision step 406 to determine if a query about the status of short term coverage has been received from the connection manager 104. If so, the coverage manager reports the status back to the connection manager 104 in step 407. After doing so or if there is no query from the connection manager, the process loops back to step 402.

Figure 5:
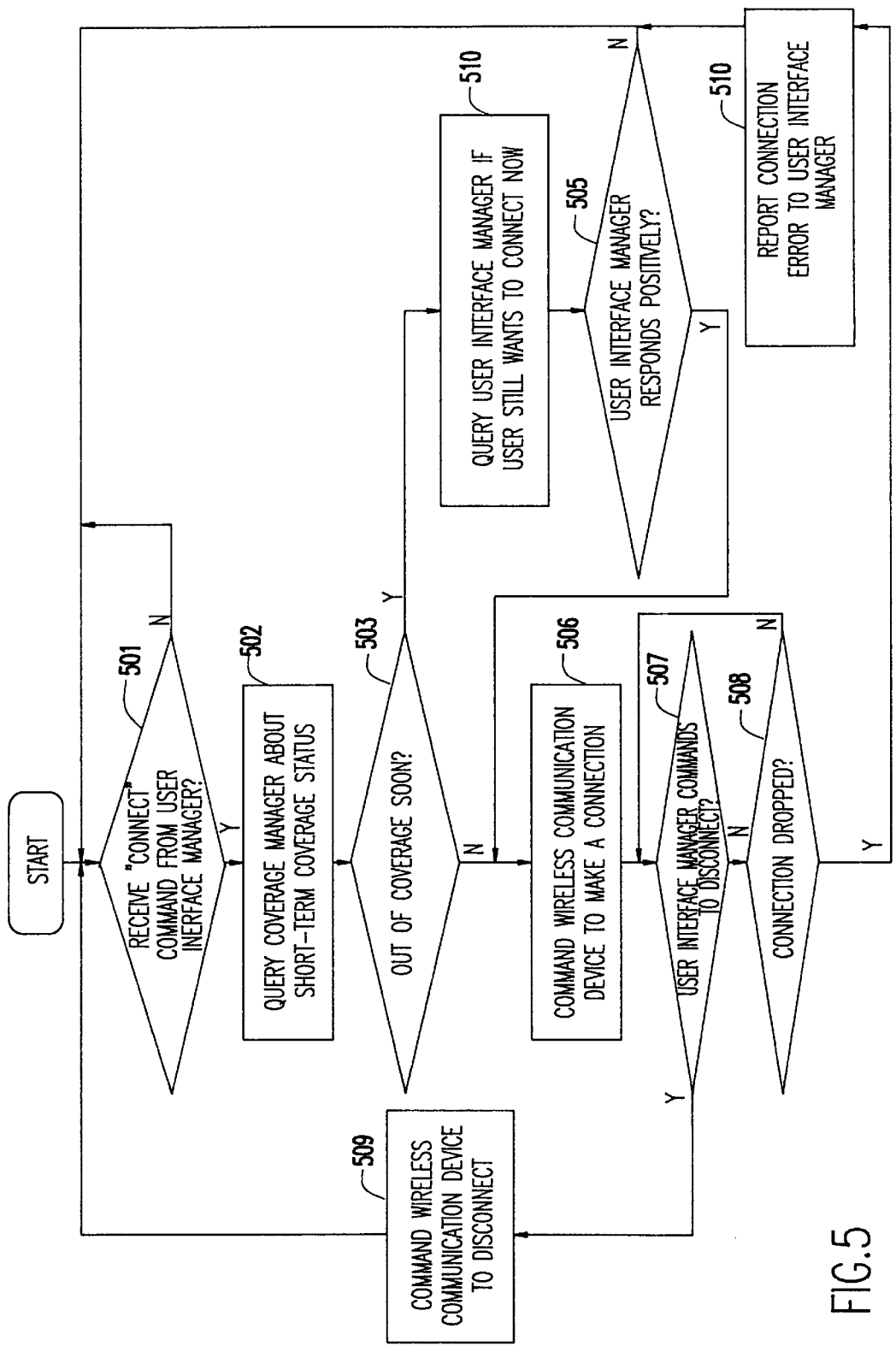
FIG. 5 is a flow chart showing the routine of the connection manager executed on the system control unit.

FIG. 5 is a flow chart showing the routine of the connection manager 104 executed on the system control unit 101. The process of the connection manager 104 starts with a decision step 501 in which the reception of a "connect" command from the user interface manager 105 is detected. When a "connect" command is detected, the connection manager queries the coverage manager 103 about the short term coverage status in step 502. The coverage manager 104 receives a query result and then determines in decision step 503 whether the query result is "out of coverage soon". If so, the connection manager queries the user interface manager 105 in step 504 if a connection is needed immediately. If the user interface responds positively as determined in decision step 505 or if coverage manager determines in decision step 503 that the query result is not "out of coverage soon", the connection manager commands the wireless communication device 115 to make a connection in step 506. On the other hand, if the user interface responds negatively as determined in decision step 505, the process loops back to step 501 to await a new request and, at the same time, the user interface manager 105 notifies the user and thereafter keeps track of coverage status. When coverage is regained, the user interface manager 105 will resend the connection request to the connection manager 104 when the coverage is regained.

Once a connection in made, the connection manager enters a monitoring loop in which the commands for disconnection are detected in decision step 507 or a dropped connection is detected in decision step 508. If a disconnect command is detected, the connection manager issues a command in step 509 to the communication device to disconnect. The process then loops back to decision step 501 to await a new connect command from the user interface manager 105. If a dropped connection is detected, a connection error is reported to the user interface manager 105 in step 510, and the process then loops back to decision step 501 to await a new connect command from the user interface manager 105.

Figure 6:
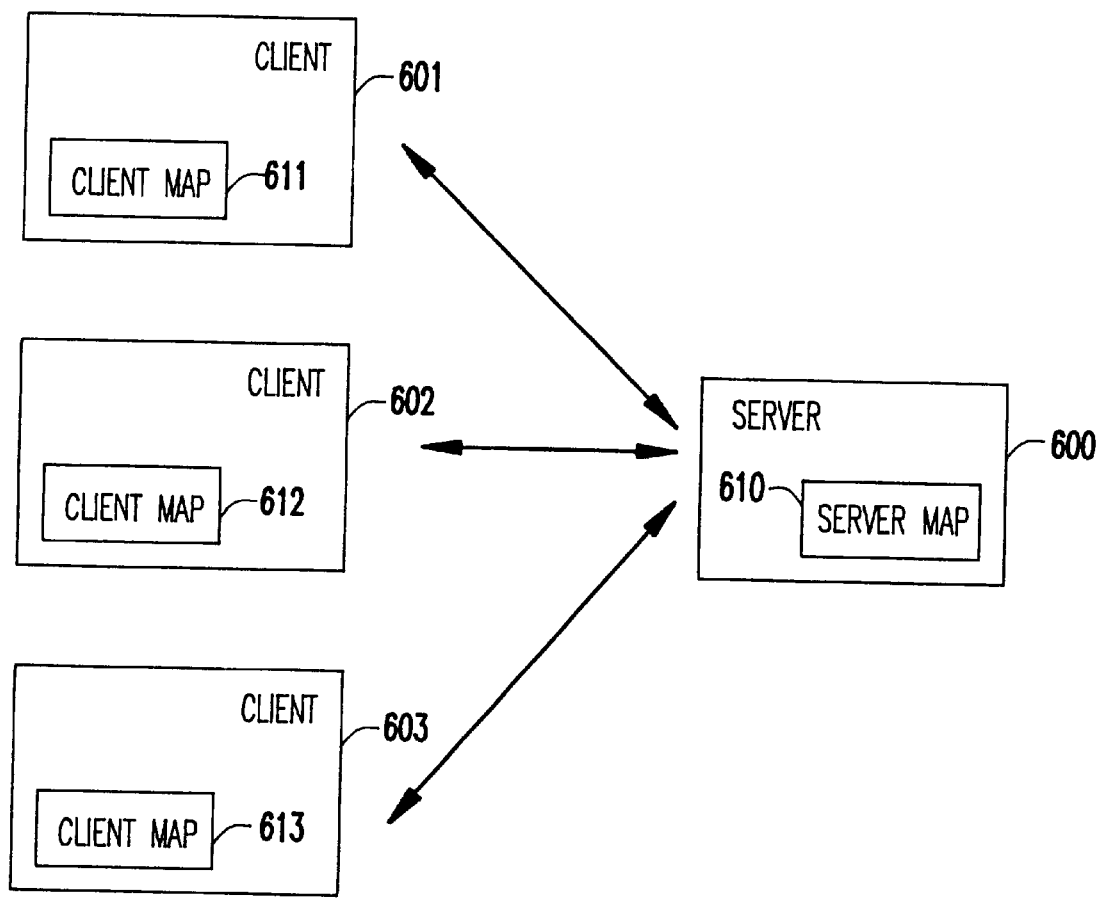
FIG. 6 is a high level block diagram showing the interaction between a server and clients for updating maps.

FIG. 6 shows the interaction between three client systems and a server system for updating a server wireless coverage map and client wireless coverage maps. Each client system will be understood to be a separate vehicle with connectivity to a wireless network, such as a cellular network, which has a connection to a computer storing a server map. Each vehicle will have a system as shown in FIG. 1. As described above, the coverage manager 103 updates the local wireless coverage map in storage device 116 based on information from the measurement device 114 and the GPS receiver 113. As shown in FIG. 6, this local updating may be augmented by updating from a central wireless coverage map.

In FIG. 6, a server 600 contains a server wireless coverage map 610, and the three client systems 601, 602 and 603 contain a client wireless coverage maps 611, 612 and 613, respectively. In general, the server map 610 is a superset of the client maps and a client map only covers the area of interest to the user. The server 600 receives map updates from clients 601, 602 and 603 in the form of pairs of location and quality of wireless coverage. This is the same information that is used at the client to update the local wireless coverage map by the coverage manager 103. By receiving this information from a plurality of clients, the server can update the server wireless coverage map 610. A client system, e.g., 601, 602 or 603, can request an up-to-date subset of the server map 610 and updates its local client wireless coverage map accordingly.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A dual map system in a vehicle for navigation and wireless communication comprising:

a location device to identify a position of the vehicle;

a wireless communication device;

a measurement device which determines the quality of wireless communication;

a storage device for storing a navigation map and a wireless coverage map; and a system control unit connected to receive inputs from each of said location device, said wireless communication device, said measurement device and said storage device, said system control unit updating the wireless coverage map based on information from said measurement device and determining whether reliable communications can be established with said wireless communication device based on current location information from said location device and said street map as compared with an updated version of said wireless coverage map.

2. The system of claim 1 further comprising a user interface between the system control unit and a user, the user interface permitting a user to input commands to the system control unit and providing output to the user from the system control unit.

3. The system of claim 2 further comprising a computer process installed on said system control unit, said computer process called a user interface manager, the user interface manager having access to the navigation map and the wireless coverage map and interacting with the user interface and the location device such that the user interface manager interprets user commands entered by a user from the user interface to execute the user's commands and presents results and notification of events to the user by the user interface.

4. The system of claim 2 further comprising a computer process installed on said system control unit, said computer process called a navigation manager, the navigation manager having access to the navigation map and the wireless coverage map and interacting with the user interface and the location device such that the navigation manager receives information from the location device and computes a route based on information in both the navigation map and wireless coverage map according to a user input.

5. The system of claim 2 further comprising a computer process installed on said system control unit, said computer process called a coverage manager, the coverage manager having access to the navigation map and the wireless coverage map and interacting with the user interface, the location device, and the measurement device such that the coverage manager initializes itself by a current version of the wireless coverage map, monitors current status of wireless coverage by interacting with the measurement device, predicts status of wireless coverage by looking at a route plan and the wireless coverage map, and notifies the user interface of events that are important to maintaining a wireless connection, the coverage manager further updating the wireless coverage map by new measurements from the measurement device and generating information about estimated time or distance until a next event of communication loss or interruption and estimates time until regaining coverage.

6. The system of claim 2 further comprising a computer process installed on the system control unit, said computer process called a connection manager, the connection manager having access to the wireless communication device and the wireless coverage map and interacting with the user interface such that the connection manager receives information from the user interface as when to make a connection and commands the wireless communication device to make a connection based on user input and information from the wireless coverage map.

7. The system of claim 2 further comprising:
 a first computer process installed on said system control unit, said first computer process called a user interface manager, the user interface manager having access to the navigation map and the wireless coverage map and interacting with the user interface and the location means such that the user interface manager interprets user commands entered by a user from the user interface to execute the user's commands and presents results and notification to the user by the user interface;
 a second computer process installed on said system control unit, said second computer process called a navigation manager, the navigation manager having access to the navigation map and the wireless coverage map and interacting with the user interface manager and the location device such that the navigation manager receives information from the location device and computes a route based on information in both the navigation map and wireless coverage map according to a user input;
 a third computer process installed on said system control unit, said third computer process called a coverage manager, the coverage manager having access to the navigation map and the wireless coverage map and interacting with the user interface manager, the location device, and the measurement device such that the coverage manager initializes itself by a current version of the coverage map, monitors current status of coverage by interacting with the measurement device, predicts status of coverage by looking at the route plan generated by the navigation manager and the wireless coverage map, and notifies the user interface manager of events that are important to maintaining wireless connection, the coverage manager further updating the wireless coverage map by new measurements from the measurement device and generates information about estimated time or distance until a next event of communication loss or interruption and estimates time until regaining coverage; and
 a fourth computer process installed on the system control unit, said fourth computer process called a connection manager, the connection manager having access to the wireless communication device and the wireless coverage map and interacts with the user interface manager and the coverage manager such that the connection manager receives information from the user interface manager and the coverage manager as when to make a connection and commands the wireless communication device to make a connection based on user input and information from the coverage manager.

8. The system of claim 1 in which the wireless coverage map is a predetermined wireless coverage map.

9. The system of claim 8 in which the system control unit updates the wireless coverage map by making measurements as the vehicle moves.

10. The system of claim 9 in which the system control unit updates a collective wireless coverage map stored at a server.

11. The system of claim 10 in which multiple vehicles update the collective wireless coverage map stored at the server.

12. The system of claim 11 in which the system control unit updates the wireless coverage map in the storage device in the vehicle by obtaining data from the server derived from the collective wireless coverage map.

13. The system of claim 1 in which the multiple wireless coverage maps are stored on the storage device, each of the wireless coverage maps being provided by different wireless service providers.

14. The system of claim 1 in which the location device is a GPS receiver.

15. The system of claim 1 in which the location device is a radio triangulation system.

16. The system of claim 15 in which the radio triangulation system is a LORAN-type system.

* * * * *